United States Patent [19]

Goebel et al.

[11] 4,042,756

[45] Aug. 16, 1977

[54] ELECTROCHEMICAL CELLS

[75] Inventors: Franz Goebel, Ashland; Nikola Marincic, Winchester, both of Mass.

[73] Assignee: GTE Laboratories Incorporated, Waltham, Mass.

[21] Appl. No.: 676,073

[22] Filed: Apr. 12, 1976

[51] Int. Cl.² .............................................. H01M 6/14
[52] U.S. Cl. ...................................... 429/94; 429/165; 429/194; 429/218
[58] Field of Search ................... 136/83 R, 100 R, 13, 136/14, 6 LN, 107, 121, 122, 20; 429/94, 165, 164, 218, 194

[56] References Cited

U.S. PATENT DOCUMENTS

| 3,096,216 | 7/1963 | Warren | 136/83 R X |
| 3,156,585 | 11/1964 | Yamano et al. | 136/14 X |
| 3,922,174 | 11/1975 | Heller | 136/6 LN |

Primary Examiner—Anthony Skapars
Attorney, Agent, or Firm—Irving M. Kriegsman

[57] ABSTRACT

Electrochemical cells having a first central anode, a second anode in the form of a concentric annular ring disposed around the central anode, a cathode, also in the form of a concentric annular ring, positioned between the first and second anodes, but not in mechanical contact therewith, and an electrolytic solution between and in contact with the anodes and cathode. The central anode can be in the form of a cylindrical rod or, preferably, a concentric annular ring.

17 Claims, 2 Drawing Figures

ELECTROCHEMICAL CELLS

BACKGROUND OF THE INVENTION

The invention relates to electrochemical cells. More particularly, it relates to electrochemical cells which have intermediate performance between high energy and high power cells.

Most of the cells made today with lithium anodes and either inorganic- or organic-based electrolytic solutions have their electrode structures packaged in a wound, spiral form in cylindrical containers. The low conductivity of the organic-based electrolytic solutions dictated such configurations in an effort to increase cell rate capabilities by providing increased surface area and closer packing of the electrodes. Such spiral electrode configurations were maintained during the period in which substantially more conductive electrolytic solutions were developed, the most important of them being formed from sulfur dioxide as the principal electrolytic solvent. The emergence of this sulfur dioxide-based electrolytic material, having a conductivity comparable to that of the best organic electrolytic solutions, but with some additional desirable characteristics, offered many alternatives in the area of cell design and construction.

In copending application Ser. No. 685,214, filed May 11, 1976, now abandoned, a continuation of application Serial No. 492,316, filed July 26, 1974, now abandoned, there are described electrochemical cells having an oxidizable active anode material, such as lithium, a carbon cathode, and an electrolytic solution between and in contact with the anode and cathode materials. The electrolytic solution includes an inorganic oxyhalide solvent, such as phosphorus oxychloride, monofluorophosphoryl dichloride, thionyl chloride, sulfuryl chloride, or mixtures thereof, and a solute dissolved therein to render the electrolytic solution ionically conductive. It was found that the carbon cathode material catalyzes the electrochemical decomposition of the solvent during discharge of the cell, thereby enabling the otherwise "dead" weight of the solvent to be utilized as a source of electrical energy.

An application Ser. No. 515,557, filed Oct. 24, 1974, now U.S. Pat. No. 3,923,543, there are described electrochemical cells having an oxidizable active anode material, such as lithium, a cathode, including, as the active cathode material, an intercalation compound of carbon and fluorine of the general formula $(C_4F)_n$, where n refers to the presence of a large, but indefinite, number of recurring $(C_4F)$ groups in the intercalation compound, and an electrolytic solution between and in contact with the anode and cathode materials. The electrolytic solution includes an inorganic oxyhalide solvent selected from those set forth above in the preceeding paragraph, and a solute dissolved therein to render the electrolytic solution ionically conductive. It was found that the above-identified intercalation compound catalyzed the electrochemical decomposition of the solvent resulting, unexpectedly, in a cell having a coulombic cathode utilization efficiency greater than 100 percent of that theoretically attainable according to the reduction of the active cathode material. As with the cells described in copending application Ser. No. 685,214, the otherwise "dead" weight of the solvent is utilized as a source of electrical energy.

Cells fabricated from the components described in the above-identified copending applications, particularly those with carbon cathodes and concentrically arranged electrodes, demonstrated exceptionally high energy densities at low discharge rates, reaching 440 Wh/kg in small cells (i.e., size AA) and extending to 550 Wh/kg in a 150 Ah size cell. Cells of this configuration have been applied successfully on a commercial scale in implantable devices, such as cardiac pacemakers.

Cells fabricated from the components described in the above-identified copending applications, particularly those with carbon cathodes and spirally-wound electrodes, demonstrated high power capabilities due to approximately an order of magnitude more electrode surface over the high energy model of the same volume. To date, such high power cells have been used only for military applications.

A study was conducted comparing and evaluating the particular design characteristics and cell capabilities for cells of constant volume but for various discharge rate capabilities desired. It was determined that, for the two basic cell configurations referred to above (i.e., concentrically arranged electrodes and spirally-wound electrodes), there existed a gap in the cell discharge rate capabilities which could be attained with these basic cell configurations. A substantial reduction in the maximum discharge rate capability is predicted when the concentric electrode structure is converted into a spirally-wound structure where the number of turns is between 1 and 2. Thus, if there is a need for a cell having twice the discharge rate capability obtainable with the concentric electrode structure, such a need cannot be fulfilled efficiently with a spirally-wound electrode configuration. It, therefore, would be desirable to provide an electrochemical cell which closes the gap in performance between the high energy cells and the high power cells referred to above.

OBJECTS OF THE INVENTION

Accordingly, it is an object of the present invention to provide novel electrochemical cells.

It is a further object of this invention to provide electrochemical cells having a novel electrode configuration.

It is a further object of this invention to provide electrochemical cells, fabricated from the components set forth in the above-identified copending applications, which effectively close the gap in performance between the high energy and high power cells fabricated from the same components.

BRIEF SUMMARY OF THE INVENTION

These and still further objects, advantages and features of the present invention are achieved, in accordance therewith, by providing an electrochemical cell having a first, central anode, a second anode in the form of a concentric annular ring disposed around the central anode, a cathode, also in the form of a concentric annular ring, positioned between the first and second anodes but not in mechanical or physical contact therewith, and an electrolytic solution between and in contact with the anodes and the cathode.

While the cell structure described above is generally applicable to all compatible cell components, it is particularly applicable to the cell components described in the above-identified copending applications [e.g., lithium, etc. anodes; carbon or $(C_4F)_n$ cathodes; and electrolytic solutions having phosphorus oxychloride, thionyl chloride, sulfuryl chloride, or mixtures thereof, as the solvent material]. Accordingly, the remainder of the description of this invention will be with reference to the preferred components, although it should be understood that the invention has greater general applicability than just with reference to the preferred components.

The two anodes, which are connected in parallel, are in electrical contact with the cell can or housing which thus serves as one terminal of the cell. The anodes are made of different thicknesses to reflect the different current distribution and the different anode utilization during the course of cell discharge, as the two reaction fronts approach each other within the cathode material. In this regard, it should be understood that the two anodes are operating under entirely different conditions. The center anode operates under flooded electrolyte conditions and thus is capable of providing higher current densities than is the outer anode where only starved electrolytic conditions are established and concentration polarization has a larger effect on discharge capabilities. Since the carbon or $(C_4F)_n$ cathode is faced on both sides by anode material (e.g., lithium), a much higher carbon or $(C_4F)_n$ utilization is achieved than in the high energy cells which have a single anode and a single cathode, each concentrically arranged. In addition, the added surface area afforded by the second anode reduces the density of the discharge current, thus reducing the undesirable effects of anode passivation or storage.

The anodes are oxidizable materials and preferably are lithium metal, generally in the form of foils which, as set forth above, may be of different thicknesses. Other anode materials include sodium, potassium, etc. The center anode should be supported by a suitable, electrically conducting, supporting grid that will also support the isolated lithium sections toward the end of the discharge and thus ensure better anode utilization in the discharge process. The grid can be made of, for example, nickel, nickel alloys (such as Monel), stainless steel, silver or platinum.

The cathode material is preferably carbon, such as graphite, carbon black, or acetylene black, or an intercalation compound of carbon and fluorine represented by the general formula $(C_4F)_n$ where $n$ refers to the presence of a large, but indefinite, number of recurring $(C_4F)$ groups in the intercalation compound. The $(C_4F)_n$ cathode material can be utilized in combination with carbon (e.g., graphite or carbon black) or $(CF)_n$. When admixed with $(CF)_n$ the intercalation compound will have an average or representative formula $(C_xF)_n$ where $x$ is greater than 1 and less than 4. Such intercalation compounds are considered mixtures of $(C_4F)_n$ and $(CF)_n$ in proportions which give the particular value of $x$. As indicated above, however, carbon is the presently preferred cathode material. These cathode materials catalyze the electrochemical reduction of the electrolyte solvent upon the surface thereof so the otherwise "dead" weight of the solvent, in combination with the oxidizable anode material, can be utilized as a source of electrical energy. The cathode is connected to the cell cover thereby affording the other terminal of the cell. The cathode can be prepared by techniques known in this art, including pressing, pasting, rolling or extruding a blend of the active cathode material with a binder material (e.g., polytetrafluoroethylene) onto a metallic grid, such as an expanded nickel screen. This may be done at ambient temperature or with the application of heat and may be followed by drying in air or under vacuum to remove volatile components.

The electrolytic solution comprises a liquid covalent inorganic oxyhalide or thiohalide solvent and a solute dissolved therein. Applicable solvent materials include phosphorus oxychloride, monofluorophosphoryldichloride, monobromophosphoryl difluoride, monofluorophosphoryl dibromide, thiophosphoryl chloride, thionyl chloride, thionyl bromide, sulfuryl chloride, monofluorothiophosphoryl dichloride, monofluorothiophosphoryl dibromide, monobromothiophosphoryl difluoride, and mixtures thereof.

It is preferred that the solvent be dried (or at least partially dried) prior to use. With regard to phosphorus oxychloride, for example, this is accomplished by boiling the solvent material with clean lithium metal for twelve hours at room temperature under an argon atmosphere. The solvent is then distilled at atmospheric pressure and the material which boils between 105° C and 106° C collected. The solvent thus prepared has a specific conductance of less than $7 \times 10^{-7}$ Mhos/cm. Other solvents can be dried in an analogous manner (with solvent collection being at or about the boiling point of the particular material), or by techniques known in the art. Since these solvents are electrochemically reducible, but otherwise relatively non-reactive, and the reaction products of such reduction are relatively non-reactive, cells can be constructed with a wide range of anode and cathode materials, particularly anode materials which themselves are highly reactive, such as, for example, lithium.

The typical solute provides at least one anion of the general formula $X^-$, $MX_4^-$, $M'X_6^-$, and $M''Cl_6^=$, where M is an element selected from the group consisting of aluminum and boron; M' is an element selected from the group consisting of phosphorus, arsenic and antimony; M'' is an element selected from the group consisting of tin, zirconium, and titanium; and X is a halogen. Examples of suitable solutes yielding anions $MX_4^-$ are: tetrachloroaluminates ($AlCl_4^-$), tetrabromoaluminates ($AlBr_4^-$), tetrachloroborates ($BCl_4^-$), and tetrafluoroborates ($BF_4^-$). Examples of solutes yielding anions $M'X_6^-$ are: hexafluorophosphates ($PF_6^-$), hexafluoroarsenates ($AsF_6^-$), hexafluoroantimonates ($SbF_6^-$), and hexachloroantimonates ($SbCl_6^-$). Examples of solutes yielding anions $M''Cl_6^=$ are: hexachlorostannates ($SnCl_6^=$), hexachlorozirconates ($ZrCl_6^=$) and hexachlorotitanates ($TiCl_6^=$). Solutes yielding a halogen anion, particularly chlorides ($Cl^-$), bromides ($Br^-$), and iodides ($I^-$), and solutes providing one of the anions dichloroiodates ($ICl_2^-$), dichlorophosphates ($PO_2Cl_2^-$), perchlorates ($ClO_4^-$) and chlorosulfates ($SO_3Cl^-$) are also contemplated within the scope of this invention.

The solute also provides at least one cation. This cation may be of an alkali metal, such as lithium, sodium, potassium, cesium, and rubidium; an alkaline earth metal, such as magnesium, calcium, strontium, and barium; or a lanthanide rare earth element, such as lanthanum, terbium, neodymium, cerium, europium and samarium. Cations having the following general formula $R_4N^+$, where R is a radical selected from the group consisting of methyl, ethyl, propyl, isopropyl, butyl and isobutyl are also contemplated to be suitable for use in this invention. Examples of suitable cations are: tetramethylammonium $(CH_3)_4^+$, tetraethylammonium $(C_2H_5)_4N^+$, tetrapropylammonium $(C_3H_7)_4N^+$, and tetrabutylammonium $(C_4H_9)_4N^+$. These cations may be added as the tetraalkylammonium chloride, for example. Other cations contemplated within the scope of this invention are those resulting from solvent dissociation such as phosphorus oxydichloride ($POCl_2^+$) in the case of a phosphorus oxychloride-based electrolytic solution, $SOCl^+$, and $SO_2Cl^+$, etc.

The solute for a particular cell can be chosen to yield a comination of any of the anions and cations listed above; however, the electrolyte must contain at least $10^{-3}$ moles per liter of cation and at least $10^{-3}$ moles per liter of anion. Preferably, at least $10^{-1}$ moles per liter of cation and at least $10^{-1}$ moles per liter of anion are present.

Solutes having lithium cations and large anions which are stable to oxidation and reduction are particularly desirable. The preferred lithium solute compounds are: lithium tetrachloroaluminate, lithium tetrachloroborate, lithium tetrafluoroborate, lithium hexafluorophosphate, lithium hexafluoroarsenate, lithium hexafluoroantimonate, lithium hexachlorostannate, lithium hexachlorozirconate, lithium hexachlorotitanate and lithium chlorosulfate. Other preferred compounds are Lewis acids, particularly aluminum chloride ($AlCl_3$), boron trichloride ($BCl_3$), boron fluoride ($BF_3$), tin chloride ($SnCl_4$), antimony chloride ($SbCl_5$), antimony fluoride ($SbF_5$), titanium chloride ($TiCl_4$), aluminum bromide ($AlBr_3$), phosphorus fluoride ($PF_5$), phosphorus chloride ($PCl_5$), arsenic fluoride ($AsF_5$), arsenic chloride ($AsCl_5$), zinc chloride ($AnCl_2$) and zirconium chloride ($ZrCl_4$), in conjunction with a metal halide such as lithium chloride. In addition, Lewis bases having the general formula $A_mB_n$ where A is an element selected from the group consisting of lithium, sodium, potassium, rubidium, cesium, magnesium, calcium, strontium, barium and the rare earths and B is an element selected from fluorine, chlorine, bromine, iodine, and oxygen are also useful. Included in this latter category are cesium chloride, rubidium chloride, and barium chloride.

The required anion and cation may be formed as a result of a chemical reaction directly with the solvent. For example, the Lewis acid $AlCl_3$ will react with the solvent $POCl_3$ to yield the anion $AlCl_4^-$. The anion and cation may also be formed as the result of the reaction of a Lewis acid with a Lewis base dissolved in the solvent. For example, lithium chloride, LiCl, a Lewis base, will react with $AlCl_3$ to form $LiAlCl_4$ which dissociates in part to solvated $Li^+$ and $AlCl_4^-$.

Although not required for the cells of this invention, a suitable separator can be employed to insulate the anode and cathode current collector materials when no electrical current flows through the external circuit. A separator prevents the mechanical and electrical contact between the cathode current collector material and the anode. A wide variety of ceramic and plastic materials having small pore sizes are available. Examples of such materials include alumina, beryllia, titania, porcelain, porous glass, fritted glass, glass mat, nonwoven porous polytetrafluoroethylene and other fluorinated polymers, polypropylene and polyethylene.

BRIEF DESCRIPTION OF THE DRAWINGS

The foregoing and still further features and advantages of the present invention will become more apparent from the following detailed description, taken together with the following drawings wherein:

Referring to FIGS. 1 and 2, there is seen an electrochemical cell 10 having a housing or outer case 12, commonly referred to as a "can". Adjacent 10, and in mechanical and electrical contact with can 12, is outer (second) anode 14 which is in the form of a hollow cylinder, the outer diameter of which is equal to the inner diameter of hollow can 12. Adjacent to and in contact with outer anode 14 is an insulating separator 16 which serves to prevent direct electrical and mechanical contact between anode 14 and cathode 18, which is also in the form of a hollow cylinder. Cathode 18 is prevented from contacting can 12 by a portion 20 of insulator 16 which is adjacent the bottom of the cell. Separator 22 prevents electrical and mechanical contact between cathode 18 and inner (first) anode 24 which, as with anode 14 and cathode 18, is in the form of a hollow cylinder. If desired, anode 24 can be in the form of a cylindrical rod, and suitable grids, (not shown) for the electrodes can be provided if necessary or desired. Anodes 14 and 24 are connected in parallel by means of wire 25. The operative terminals of the cell are the can 12 per se (generally the bottom thereof) which is in electrical contact with anode 14, and contact 28 which is connected to cathode 18 via wire 30. Contact 28 is separated from can 12 by an insulating separator 32. The electrolytic solution (not numerically designated) fills the pores in cathode 18 and separators 16 and 22 so as to provide the necessary internal electrical circuit between the various electrodes. Central core 26 provides additional volume for the electrolytic solution thereby adding to the overall electrical capacity attainable with the cells described herein.

Figure 1:
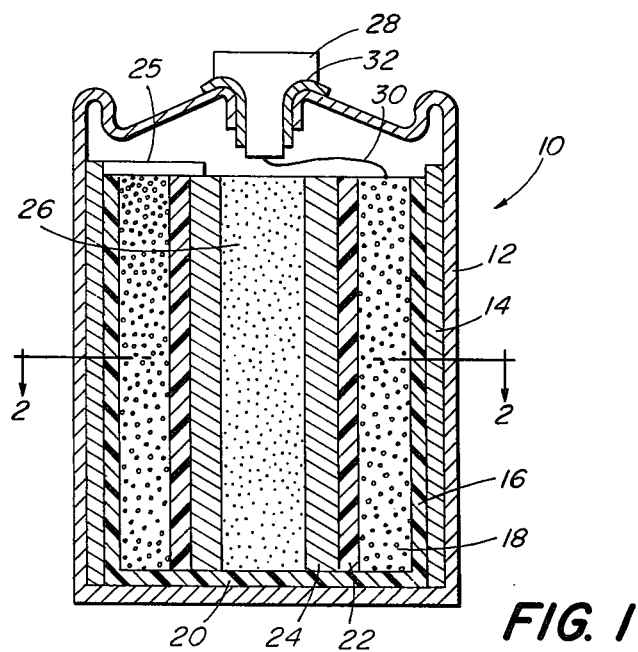
FIG. 1 is a vertical cross-sectional view of a symmetrical electrochemical cell fabricated according to the teachings of this invention.
Figure 2:
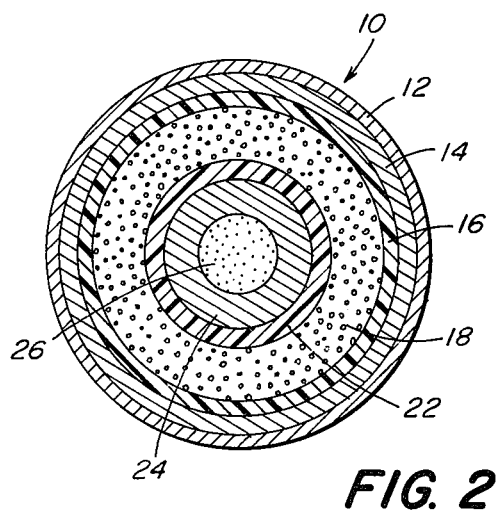
FIG. 2 is a cross-sectional view of the cell of FIG. 1 taken along line 1—2 of FIG. 1.

Cells of the type described herein have been built in C- and D-size configurations with two lithium anodes and a carbon cathode. When tested under constant load and current conditions they exhibited an average of 15–20% capacity increase over corresponding high energy and high power cells at discharge rates of 1–2 mA/$Cm^2$ of electrode surface area. C-size cells (lithium anodes and carbon cathode) when discharged at twice the rate recommended for the high energy C-size cell (e.g., 50 mA) exhibited capacities between 5.5—6 Ah above a 3.0 volt cut-off and energy densities of approximately 400 Wh/kg.

DESCRIPTION OF SPECIFIC EMBODIMENTS

The following Examples are given to enable those skilled in the art to more clearly understand and practice the present invention. They should not be considered as a limitation of the scope of the invention but merely as being illustrative and representative thereof.

EXAMPLE I

A "C-size" cell is fabricated having a central lithium anode comprising a 1.4 inch × 1.4 inch × 0.035 inch lithium ribbon rolled about a ¼ inch diameter rod, an outer lithium anode (in the form of a concentric ring) comprising a 3.0 inch × 1.5 inch × 0.035 inch lithium sheet, and an intermediate carbon cathode (in the form of a concentric ring) 1.5 inch high and having an outside diameter of 0.85 inch and an inside diameter of 0.040 inch. A glass cloth separated each of the lithium anodes from the intermediate carbon cathode. The cathode contained a blend of 97 g. of Shawinigan carbon black (50% compressed) and 3 g. of a tetrafluoroethylene binder. The electrodes were inserted into a "C" size nickel housing to which there is added 14 ml. of an electrolyte comprising 1.8 M of lithium tetrachloroaluminate in thionyl chloride. Capacity to a cut-off voltage of 3.0 volts was 6 amp. hours at a 50 mA discharge rate.

EXAMPLE II

A "D-size" cell is fabricated having a central lithium anode comprising a 1.75 inch × 2.5 inch × 0.060 inch lithium ribbon rolled about a ¼ inch diameter rod, an inner lithium anode (in the form of a concentric ring) comprising a 3.75 inch × 1.75 inch × 0.070 inch lithium sheet, and an intermediate carbon cathode (in the form of a concentric ring) 1.75 inch high and having an outside diameter of 1.1 inch and an inside diameter of 0.062 inch. A piece of glass cloth separated each of the lithium anodes from the intermediate carbon cathode. The cathode contained a blend of 97 g. of Shawinigan carbon black (50% compressed) and 3 g. of a polytetrafluoroethylene binder. The electrodes were inserted into a "D" size nickel-plated steel housing to which there is added 32 ml. of an electrolyte comprising 1.8 M of lithium tetrachloroaluminate in thionyl chloride. Capacity to a cut-off voltage of 3.0 volts was 11 amp. hours at a 100 mA discharge rate.

The embodiments of the present invention are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. An electrochemical cell comprising a first, central electrode of one polarity; a second electrode of the same polarity as said first, central electrode, said second electrode being disposed around said first, central electrode but not in mechanical contact therewith; a third electrode of a polarity opposite to said first and second electrodes, said third electrode being disposed between said first and second electrodes but not in mechanical contact therewith; and an electrolytic solution between and in contact with said first, second and third electrodes, said first and second electrodes of the same polarity being greater in number than the number of electrodes of the polarity opposite to the first polarity.

2. The cell of claim 1 wherein said first and second electrodes are anodes, and said third electrode is a cathode.

3. The cell of claim 1 wherein said first and second electrodes are anodes which are connected in parallel.

4. The cell of claim 1 wherein said first and second electrodes are anodes of different thickness.

5. The cell of claim 1 wherein said first electrode operates under flooded electrolyte conditions and said second electrode operates under starved electrolyte conditions.

6. The cell of claim 1 wherein said first electrode is a cylindrical rod.

7. The cell of claim 1 wherein said first electrode is a hollow cylinder.

8. The cell of claim 1 wherein each of said electrodes is a hollow cylinder.

9. The cell of claim 1 wherein each of said electrodes is a hollow, concentric cylinder.

10. The cell of claim 1 wherein said first and second electrodes are each lithium.

11. The cell of claim 1 wherein said third electrode is carbon.

12. The cell of claim 1 wherein said third electrode is $(C_4F)_n$, where n refers to the presence of an indeterminately large number of recurring $(C_4F)$ groups in the material comprising said third electrode.

13. The cell of claim 1 wherein said first and second electrodes are lithium and said third electrode is carbon.

14. The cell of claim 1 wherein said first and second electrodes are lithium and said third electrode is $(C_4F)n$, where n refers to the presence of an indeterminately large number of recurring $(C_4F)$ groups in the material comprising said third electrode.

15. The cell of claim 1 wherein said electrolyte solution comprises an inorganic oxyhalide solvent and a solute dissolved therein to render said electrolyte solution ionically conductive.

16. The cell of claim 15 wherein said inorganic oxyhalide solvent is phosphorus oxychloride, thionyl chloride, sulfuryl chloride, monofluorophosphoryl dichloride, or mixtures thereof.

17. The cell of claim 1 wherein said third electrode is carbon or $(C_4F)_n$, where n refers to the presence of an indeterminately large number of recurring $(C_4F)$ groups in the material comprising said third electrode, and said electrolytic solution comprises an inorganic oxyhalide solvent and a solute dissolved therein, said solvent being electrochemically reduced upon the surface of said third electrode during discharge of said cell, whereby said solvent in conjunction with said first and second electrodes serves as a source of electrical energy during discharge of said cell.

* * * * *